(12) United States Patent
Tao et al.

(10) Patent No.: US 11,474,981 B2
(45) Date of Patent: Oct. 18, 2022

(54) DATABASE DUAL-CORE STORAGE SYSTEM BASED ON OPTICAL DISK AND METHOD USING THE SYSTEM

(71) Applicants: Guangyi Tao, Beijing (CN); Chunyang Liu, Beijing (CN); Zongpeng Tao, Beijing (CN)

(72) Inventors: Guangyi Tao, Beijing (CN); Chunyang Liu, Beijing (CN); Zongpeng Tao, Beijing (CN)

( * ) Notice: Subject to any disclaimer, the term of this patent is extended or adjusted under 35 U.S.C. 154(b) by 867 days.

(21) Appl. No.: 16/311,694

(22) PCT Filed: Jun. 7, 2017

(86) PCT No.: PCT/CN2017/000381
§ 371 (c)(1),
(2) Date: Jun. 11, 2019

(87) PCT Pub. No.: WO2018/006577
PCT Pub. Date: Jan. 11, 2018

(65) Prior Publication Data
US 2019/0294593 A1 Sep. 26, 2019

(30) Foreign Application Priority Data
Jul. 4, 2016 (CN) .......................... 201610519740.5

(51) Int. Cl.
*G06F 16/00* (2019.01)
*G06F 16/21* (2019.01)
(Continued)

(52) U.S. Cl.
CPC .......... *G06F 16/213* (2019.01); *G06F 3/0607* (2013.01); *G06F 3/0619* (2013.01);
(Continued)

(58) Field of Classification Search
None
See application file for complete search history.

(56) References Cited

U.S. PATENT DOCUMENTS

| 7,827,201 B1* | 11/2010 | Gordon | G06F 16/289 707/792 |
| 2008/0177994 A1* | 7/2008 | Mayer | G06F 16/00 709/224 |
| 2015/0193473 A1* | 7/2015 | Tao | G06F 11/1456 707/803 |

FOREIGN PATENT DOCUMENTS

CN 103177127 A * 6/2013 ......... G06F 16/2228

* cited by examiner

*Primary Examiner* — Tuankhanh D Phan
(74) *Attorney, Agent, or Firm* — Novoclaims Patent Services LLC; Mei Lin Wong

(57) ABSTRACT

A database dual-core storage system based on optical disk comprises a server, a magnetic disk storage device and an optical disk storage device connecting to the server via data connection, a database management system, a data processor and a data connector installed on the server, wherein the database management system is arranged for completing database management and data management of the magnetic disk storage device and the optical disk storage device in response to data requests; the data processor is arranged for configuring fields of a database base core and fields of a database extension core, writing data of corresponding fields into the database base core and the database extension core respectively in response to data requests; the data connector is arranged for creating data connection between the database base core and the database extension core in response to data requests. The integrity and safety of data are guaranteed.

6 Claims, 6 Drawing Sheets

(51) Int. Cl.
*G06F 16/13* (2019.01)
*G06F 3/06* (2006.01)
(52) U.S. Cl.
CPC .......... *G06F 3/0638* (2013.01); *G06F 3/0685* (2013.01); *G06F 16/00* (2019.01); *G06F 16/134* (2019.01)

DATABASE DUAL-CORE STORAGE SYSTEM BASED ON OPTICAL DISK AND METHOD USING THE SYSTEM

CROSS REFERENCE OF RELATED APPLICATION

This is a national phase national application of an international patent application number PCT/CN2017/000381 with a filing date of Jun. 7, 2017, which claimed priority of a foreign application number CN 201610519740.5 with a filing date of Jul. 4, 2016 in China. The contents of these specifications, including any intervening amendments thereto, are incorporated herein by reference.

BACKGROUND OF THE PRESENT INVENTION

Field of Invention

The present invention relates to a database storage system and method, and particularly relates to a storage system and method of creating a database base core and a database extension core.

Description of Related Arts

Date produced by digitalizing massive historical paper records and massive data produced by modern digital equipment and computer integrate together, and will form a complete data link to realize real big data. Effective utilization of big data will bring huge social and economic benefits.

To make full use of big data, the first is data storage, the second is data aggregation and integration. On this basis, it is possible to find information needed from big data effectively and rapidly. Data sources include structured data, semi-structured data and unstructured data. Format, quantity and capacity of the unstructured data are continuously increasing, which causes great technical problem for data storage, data aggregation and integration.

In the existing technology, two methods are used basically for storing the unstructured data in magnetic disk. One method is to store the unstructured data directly in file server by file system, which lacks unified management and control for data. The other method is to store the unstructured data into BLOB field of relational database. Proliferation of the unstructured data makes the relational database expanse rapidly, which leads to degradation of the database performance. The unstructured data can be stored directly on an optical disk, and the unstructured data stored on the optical disk is managed using directory of the relational database. It is difficult to manage, full-search and retrieve large capacity unstructured data using the methods of storing the unstructured data in the magnetic disk and on the optical disk.

In the patent application named "Database Storage System based on Optical Disk and Method Using the System" with the patent application number CN 201210431169.3, and named "Database Storage System based on Jukebox and Method Using the System" with the patent application number CN 201310136328.1, it is necessary that all data is input into a database. On the premise of guaranteeing integrity of database data, the database is built on the optical disk. In the existing technology, it is impossible to input all format data into the database, data of some fields has to be stored separately from the database. Therefore, the above mentioned technical solutions cannot be adopted to store the database and data of some fields stored separately from the database on the optical disk.

To solve the above mentioned technical problems, in the patent application named "Data Storage System outside Database based on Optical Disk and Method Using the System" with the patent application number CN 201410273449.5, a technical solution is provided, in which data of a part of fields of a record is input into a database, and data of the other fields of the record is stored outside the database and pasted to the database. Using the technical solution, data stored in the database and data stored outside the database can be stored on an optical disk, and data stored in the database and data stored outside the database on the optical disk can be managed, which solves the technical problems of managing and accessing data stored outside the database on the optical disk. Because data of some fields is stored outside the database using the technical solution, the overall response performance of the data stored in the database and the data stored outside the database is defective, which cannot meet the needs of a large number of transaction processing in data fusion and data analysis.

SUMMARY OF THE PRESENT INVENTION

An object of the present invention is to provide a database dual-core storage system based on optical disk in order to solve the technical problems of storing all format data and large capacity files into a database.

Another object of the present invention is to provide the methods of the database dual-core storage based on optical disk in order to solve the technical problems of storing all format data and large capacity files using a database on an optical disk.

According to the present invention, the database dual-core storage system based on optical disk comprises a server, a magnetic disk storage device and an optical disk storage device connecting to the server via data connection, a database management system, a data processor and a data connector installed on the server.

The database management system is arranged for completing database management and data management of the magnetic disk storage device and for completing database management and data management of the optical disk storage device in response to data requests.

The data processor is arranged for configuring fields of a database base core and fields of a database extension core, writing data of the corresponding fields into the database base core and the database extension core respectively in response to data requests.

The data connector is arranged for creating data connection between the database base core and the database extension core in response to data requests.

The database management system comprises a field structure generation module, a record index generation module, a storage space allocation module, a storage space status module, a record linkage module, a record split module, a database structure generation module and a dual-core generation module.

The field structure generation module reads field structure information of each record of the database and writes the field structure information of each record of the database into a database file or the database management system, wherein the field structure information comprises a data type and a data length of each field of the record.

The record index generation module records index information of each record of the database and writes the index information of each record of the database into the database file or the database management system, wherein the index information comprises a modification time and a modification content of each field of the record.

The storage space allocation module records position information of allocated standard storage units of each record in the database file, and writes the position information into the database file or the database management system.

The storage space status module records free space information of the allocated standard storage units in the database file, and writes the free space information into the database file or the database management system.

The record linkage module combines the field structure information, the index information, the position information and the space information of the standard storage units of each record of the database to form database properties data, and writes the database properties data into the database file or the database management system.

The record split module processes a record splitting process for the records of the database according to the command of the database management system, wherein the record splitting process is processed in a record unit, in which the database properties data is read, the position and the amount of data of each field in the records are determined, records conforming to the command parameters are marked, and marked information is written into the database file or the database management system.

The database structure generation module forms an independent data file for the database structure of the database, wherein the database management system creates an optical disk database having a database structure identical to the magnetic disk database on an optical disk or creates a magnetic disk database having the same database structure in other magnetic disk storage device based on the independent data file.

The dual-core generation module creates a database base core or a database file of the database base core, and a database extension core or a database file of the database extension core in the magnetic disk database in the magnetic disk by the database management system, or creates a database base core or a database file of the database base core, and a database extension core or a database file of the database extension core in the optical disk database on the optical disk by the database management system, and writes creation information into the database file or the database management system.

The data processor comprises a filed configuration model and a data input model.

The filed configuration model configures fields of a database base core and fields of a database extension core based on a data type and a data length of each field of records, and forms subrecords of the base core and subrecords of the extension core, and writes field configuration information into the database file or the database management system.

The data input model writes data of the corresponding fields into the database base core and the database extension core in the magnetic disk or the database base core and the database extension core on the optical disk respectively based on the fields of the database base core and the fields of the database extension core configured by the filed configuration model according to the command of the database management system.

The data connector comprises a dual-core connection model which connects a subrecord of the database base core and a corresponding subrecord of the database extension core to form an integral record according to the command of the database management system.

A method of storing data into a database base core and a database extension core in a magnetic disk storage device and an optical disk storage device, wherein the steps are as follows: when transferring data forward, requests are made to configure fields of a database base core and fields of a database extension core in a database for the data processor by the database management system, then the fields of the database base core and the fields of the database extension core are configured by the data processor based on a data type and a data length of each field of records; requests are made to write data of the corresponding fields into the database base core and the database extension core respectively for the data processor by the database management system, then the data of the corresponding fields is written into the database base core and the database extension core respectively by the data processor; when transferring data backward, requests are made to configure fields of the database base core and fields of the database extension core in a database for the data processor by the database management system, then information of the configured fields of the database base core and the configured fields of the database extension core is returned by the data processor, and the information of the configured fields of the database base core and the configured fields of the database extension core is obtained by the database management system; requests are made to write data of the corresponding fields into the database base core and the database extension core respectively for the data processor by the database management system, then information of the data written into the database base core and the database extension core is returned by the data processor, and the information of the data written into the database base core and the database extension core is obtained by the database management system; information of integral records is formed from the information of the data written into the database base core and the database extension core by the data connector.

A method of creating a database directly on an optical disk and storing data into a database dual-core, wherein the steps are as follows: in step 110, obtaining capacity parameters of optical disk storage media by the database management system; in step 115, creating a database file on the optical disk storage media by the database structure generation module; in step 120, creating a database base core and a database extension core in a database on the optical disk storage media by the dual-core generation model; in step 125, configuring fields of the database base core and fields of the database extension core by the filed configuration model; in step 130, adding subrecords of the base core and subrecords of the extension core into the database file on the optical disk storage media through the data input module, retaining written field structure information of the corresponding subrecords of the base core and the corresponding subrecords of the extension core through the field structure generation module, retaining index information of the corresponding subrecords of the base core and the corresponding subrecords of the extension core through the record index generation module, retaining position information of standard storage units of the corresponding subrecords of the base core and the corresponding subrecords of the extension core through the storage space allocation module, retaining space information of the standard storage units of the subrecords of the base core and the subrecords of the extension core through the storage space status module, and retaining corresponding database properties data generated through the record linkage module by the database management system; in step 135, determining whether to reach the capacity value of the storage space, if yes, executing step 145, otherwise executing step 140; in step 140, repeating step 130, updating the retained database properties data; in step 145, when the capacity of the database reaches the capacity value of the storage space of the optical disk, writing the retained database properties data into the database on the optical disk by the database management system, and completing the creation of the database on the optical disk and the storage of the subrecords of the base core and the subrecords of the extension core; in step 150, connecting the subrecords of the base core and the corresponding subrecords of the extension core to form integral records through the dual-core connection model according to the command of the database management system.

A method of transferring a database created in the magnetic disk and data stored in a database dual-core onto optical disks, wherein the steps are as follows: in step 210, obtaining capacity parameters of optical disk storage media by the database management system; in step 215, splitting a database in a magnetic disk according to the capacity of the optical disk storage media through the record split module by the database management system, and forming marked information of subdatabases; in step 220, creating a database file on a corresponding optical disk by the database structure generation module; in step 225, creating a database base core and a database extension core in the database on the optical disk by the dual-core generation model, in step 230, configuring fields of the database base core and fields of the database extension core on the optical disk according to the fields of the database base core and the fields of the database extension core in the magnetic disk by the filed configuration model; in step 235, writing data of the fields of corresponding subrecords of the base core and corresponding subrecords of the extension core into the database base core and the database extension core on the corresponding optical disk respectively by the data input module; in step 240, writing field structure information of the corresponding subrecords of the base core and the corresponding subrecords of the extension core into the database file on each optical disk through the field structure generation module; in step 245, writing index information of the corresponding subrecords of the base core and the corresponding subrecords of the extension core into the database file on each optical disk through the record index generation module; in step 250, writing position information of standard storage units of the corresponding subrecords of the base core and the corresponding subrecords of the extension core into the database file on each optical disk through the storage space allocation module; in step 255, recording space information of the standard storage units through the storage space status module; in step 260, forming corresponding database properties data of the database on each optical disk through the record linkage module, and completing the creation of the database on each optical disk and the storage of the subrecords of the base core and the subrecords of the extension core; in step 270, connecting the subrecords of the base core and the corresponding subrecords of the extension core to form integral records through the dual-core connection model according to the command of the database management system.

A database base core and a database extension core are created in a database in the magnetic disk storage device using the database dual-core storage system based on optical disk of the present invention. The database base core is used mainly for storing the structured data and small capacity files belonging to the unstructured data. The database extension core is used mainly for storing large capacity files belonging to the unstructured data, including electronic documents, images, audio and video, etc. Fields of the database base core and fields of the database extension core are create based on a data type and a data length of each field of records. Fields of a record are divided into two parts. A part of the fields are in the database base core, and the other part of the fields are in the database extension core. The fields of the database base core constitute a subrecord of the base core, and the fields of the database extension core constitute a subrecord of the extension core. The subrecord of the base core and the corresponding subrecord of the extension core form an integral record. Various format data of all fields of records can be written into the database, which improves functions and structure of the database for managing and storing large capacity data. Because the database base core and the database extension core are the integral two parts, and the subrecord of the base core and the subrecord of the extension core are the integral two parts, which guarantees the integrity and security of data.

Using the method of the database dual-core storage based on optical disk of the present invention, data of the database base core and data of the database extension core are output automatically when data of the database are output, and subrecords of the base core and subrecords of the extension core are output automatically when records of the database are output. Various type data can be converged and integrated using the database.

Using the method of the database dual-core storage based on optical disk of the present invention, a database is created on an optical disk, and a database base core and a database extension core are created in the optical disk database on the optical disk. With capacity of blu-ray disc increases continuously, 100 GB blu-ray disc has being mass produced, and 300 GB blu-ray disc has been developed successfully, blu-ray disc can be used to store large capacity database. Fields of the database base core and fields of the database extension core are configured based on a data type and a data length of each field of records. Fields of a record can be divided into two parts. A part of the fields are in the database base core, and the other part of the fields are in the database extension core. The fields of the database base core constitute a subrecord of the database base core, and the fields of the database extension core constitute a subrecord of the database extension core. The subrecord of the base core and the corresponding subrecord of the extension core form an integral record. Using the method, data of all fields of records is written into the database on the optical disk. Because the database base core and the database extension core are the integral two parts, and the subrecords of the base core and the subrecords of the extension core are the integral two parts, which guarantees the integrity and security of data on the optical disk. It realizes that large capacity files (e.g. video, picture, image, etc.) are stored, managed and accessed in large scale using the method of creating the database on the optical disk.

Based on long life, energy saving, environmental protection and high safety of the optical disk storage, large capacity data that is stored in the magnetic disk array can be transferred and stored onto the optical disk, and large capacity data that is stored in the magnetic disk and is used often, but infrequently, can be transferred and stored into the optical disk, which optimizes structure of data storage and data response, and reduces cost of data storage.

The present invention is further illustrated through the following embodiments and the accompanying drawings.

DETAILED DESCRIPTION OF THE PREFERRED EMBODIMENT

Figure 1:
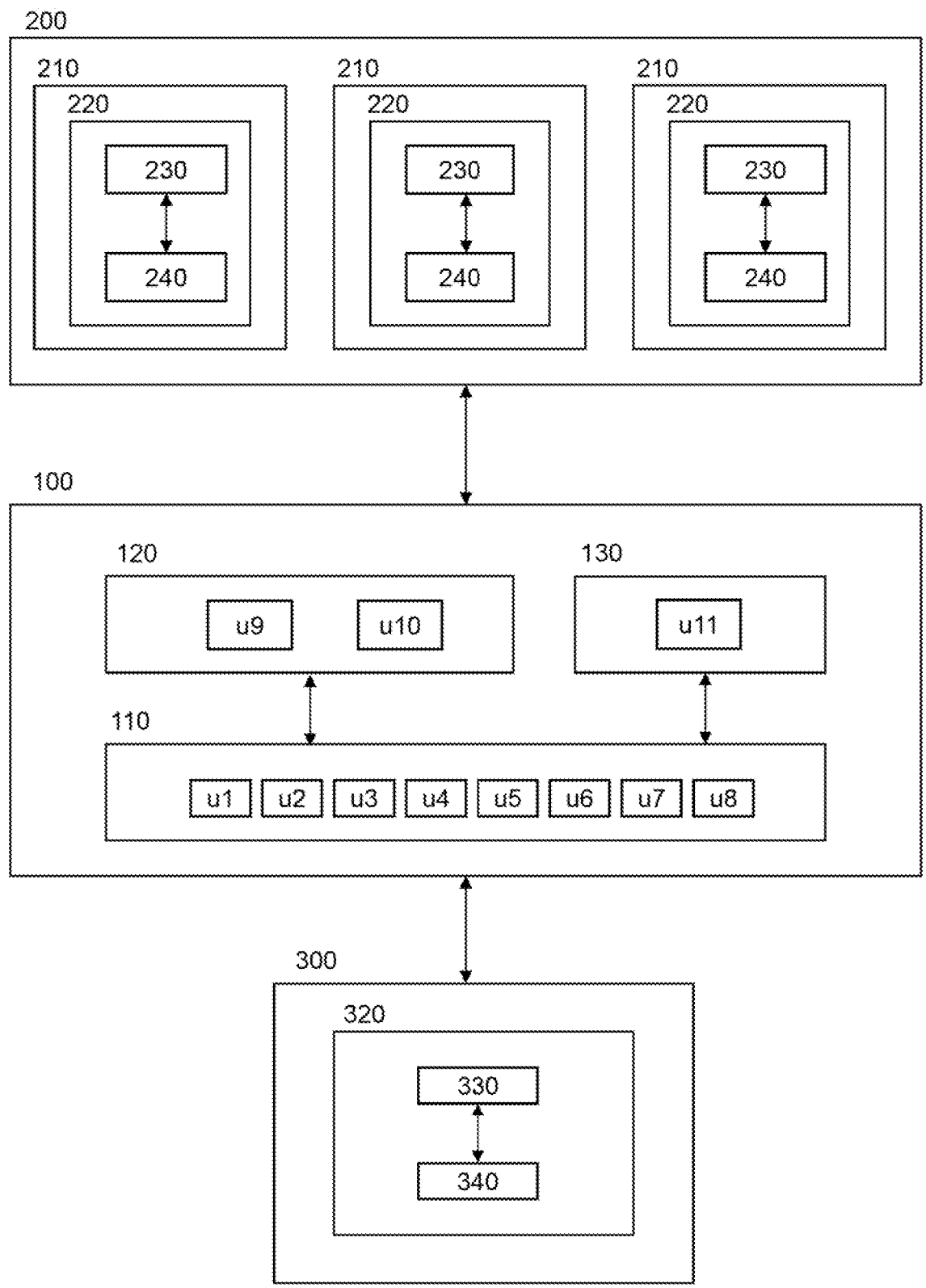
FIG. 1 is a schematic diagram of the structure according to the preferred embodiment of the database dual-core storage system based on optical disk of the present invention.
Figure 2:
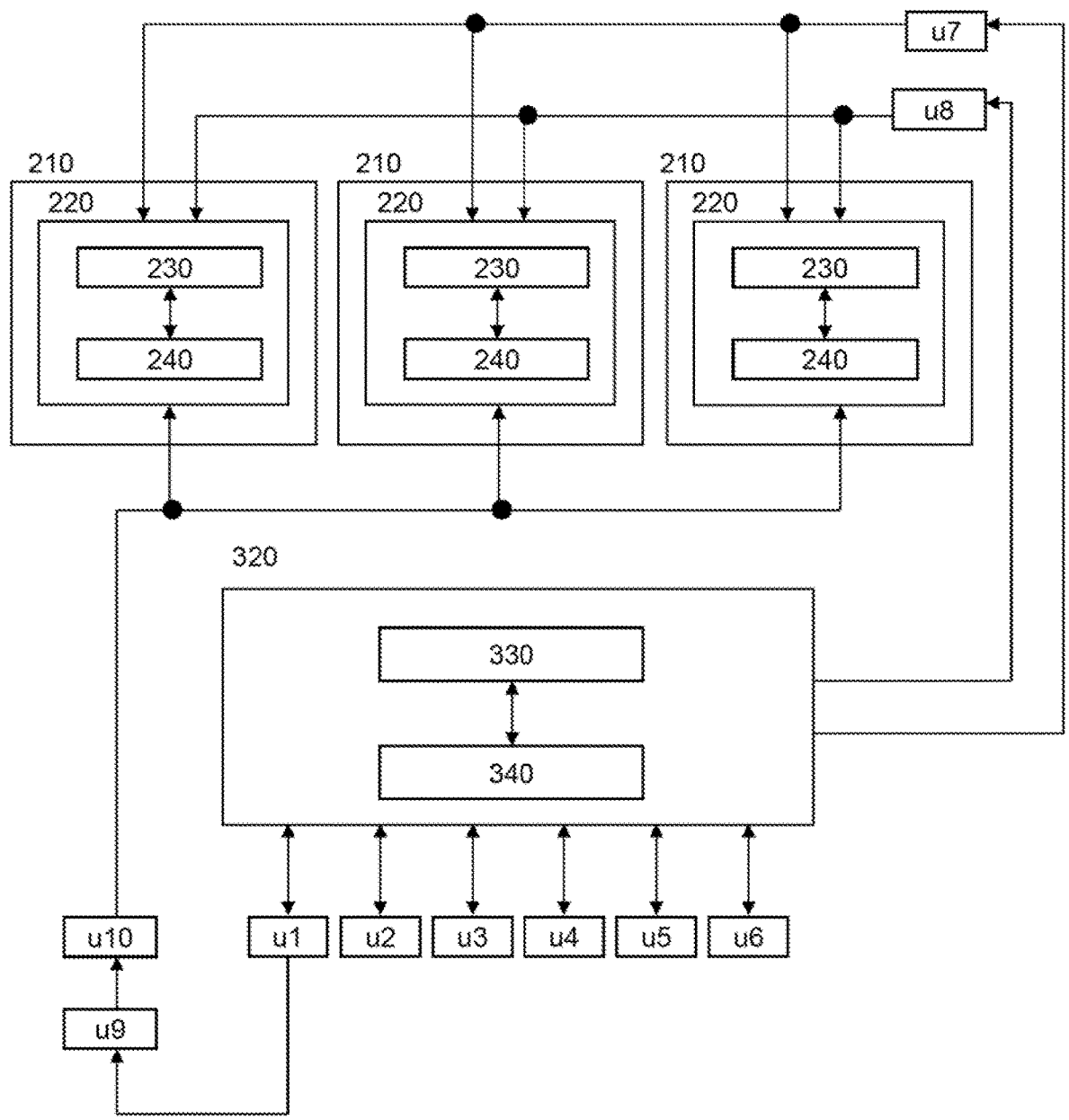
FIG. 2 is a schematic diagram of the structure of the database management system according to the preferred embodiment of the database dual-core storage system based on optical disk of the present invention.

According to the preferred embodiment of the present invention, which is shown in FIG. 1 and FIG. 2, a database dual-core storage system based on optical disk comprises a server (100), a magnetic disk storage device (300) and a jukebox (200) as an optical disk storage device connecting to the server via data connection, a database management system (110), a data processor (120) and a data connector (130) installed on the server (100). A magnetic disk database (320) is created in the magnetic disk storage device (300). Optical disk databases (220) are created on optical disks (210) in the jukebox (200). The optical disks are exchanged in optical disk drives using an optical disk exchange mechanism in the jukebox, data is read and written on each optical disk using the optical disk drives. TRIP is used as the database management system (110). The magnetic disk storage device is RAID magnetic disk array. The jukebox is Grundig 2105.

The server connects with the jukebox (200) and the magnetic disk storage device (300) respectively via data connection. The database management system (110), the data processor (120) and the data connector (130) are installed on the server (100). The database management system (110) is arranged for completing database management and data management of the magnetic disk storage device and for completing database management and data management of the optical disk storage device in response to data requests. The data processor (120) is arranged for configuring fields of a database base core and fields of a database extension core, writing data of the corresponding fields into the database base core and the database extension core respectively in response to data requests. The data connector (130) is arranged for creating data connection between the database base core and the database extension core in response to data requests.

Fields of a record stored in a database are divided into two parts by the data processor (120). A part of the fields are in the database base core, and a database (sub)file corresponding to the database base core is formed. The other part of the fields are in the database extension core, and a database (sub)file corresponding to the database extension core is formed. The fields of the database base core constitute a subrecord of the base core, and the fields of the database extension core constitute a subrecord of the extension core. The subrecord of the base core and the corresponding subrecord of the extension core form an integral record through the data connector (130). The database (sub)file corresponding to the database base core and the database (sub)file corresponding to the database extension core form an integral database file through the data connector (130).

The database management system (110) is arranged for creating the database (320) in the magnetic disk (300), and creating the databases (220) on the optical disks (210) in response to data requests; the jukebox (200) completes exchanging the optical disks (210) in optical disk drives according to corresponding data command of the database management system (110) in practical application.

The database management system (110) comprises a field structure generation module (u1), a record index generation module (u2), a storage space allocation module (u3), a storage space status module (u4), a record linkage module (u5), a record split module (u6), a database structure generation module (u7) and a dual-core generation module (u8).

The field structure generation module (u1) reads field structure information of each record of the database and writes the field structure information of each record of the database into a database file or the database management system (110), wherein the field structure information comprises a data type and a data length of each field of the record.

The record index generation module (u2) records index information of each record of the database and writes the index information of each record of the database into the database file or the database management system (110), wherein the index information comprises a modification time and a modification content of each field of the record.

The storage space allocation module (u3) records position information of allocated standard storage units of each record in the database file, and writes the position information into the database file or the database management system (110).

The storage space status module (u4) records free space information of the allocated standard storage units in the database file, and writes the free space information into the database file or the database management system (110).

The record linkage module (u5) combines the field structure information, the index information, the position information and the space information of the standard storage units of each record of the database to form database properties data, and writes the database properties data into the database file or the database management system (110).

The record split module (u6) processes a record splitting process for the records of the database according to the command of the database management system (110), wherein the record splitting process is processed in a record unit, in which the database properties data is read, the position and the amount of data of each field in the records are determined, records conforming to the command parameters are marked, and marked information is written into the database file or the database management system (110).

The database structure generation module (u7) forms an independent data file for the database structure of the database, wherein the database management system (110) creates an optical disk database (220) having a database structure identical to the magnetic disk database on an optical disk or creates a magnetic disk database (320) having the same database structure in other magnetic disk storage device based on the independent data file.

The dual-core generation module (u8) creates a database base core (330) or a database file of the database base core (330), and a database extension core (340) or a database file of the database extension core (340) in the magnetic disk database (320) in the magnetic disk by the database management system (110), or creates a database base core (230) or a database file of the database base core (230), and a database extension core (240) or a database file of the database extension core (240) in the optical disk database (220) on the optical disk by the database management system (110), writes creation information into the database file or the database management system (110).

The data processor (120) comprises a filed configuration model (u9) and a data input model (u10).

The filed configuration model (u9) configures fields of a database base core and fields of a database extension core based on a data type and a data length of each field of records, and forms subrecords of the base core and subrecords of the extension core, and writes field configuration information into the database file or the database management system (110).

The data input model (u10) writes data of the corresponding fields into the database base core (330) and the database extension core (340) in the magnetic disk or the database base core (230) and the database extension core (240) on the optical disk respectively based on the fields of the database base core and the fields of the database extension core configured by the filed configuration model (u9) according to the command of the database management system (110).

The data connector (130) comprises a dual-core connection model (u11) which connects a subrecord of the database base core and a corresponding subrecord of the database extension core to form an integral record according to the command of the database management system (110).

As shown in FIG. 2, a corresponding database (sub)file of the database base core (330) and a corresponding database (sub)file of the database extension core (340) in the magnetic disk constitute a corresponding integral database file, or a corresponding database (sub)file of the database base core (230) and a corresponding database (sub)file of the database extension core (240) on the optical disk constitute a corresponding integral database file, which is used for aggregation of complementation among fields of different data types and data lengths.

The database 220 having a database structure identical to the magnetic disk database is created on an optical disk by the database structure generation module (u7). The database base core (230) and the database extension core (240) are created based on the database structure by the dual-core generation module (u8). The database management system (110) can obtain the field structure information of the records of the magnetic disk database by the field structure generation module (u1), configures the fields of the database base core and the fields of the database extension core on the optical disk according to the field structure information of the records of the magnetic disk database by the filed configuration model (u9), and writes data of the corresponding fields into the database base core (230) and the database extension core (240) on the optical disk respectively by the data input model (u10). This process can be interoperable between the database base core (330) and the database extension core (340) in the magnetic disk, and the database base core (230) and the database extension core (240) on the optical disk.

Using the corresponding database base core and database extension core created in the magnetic disk and on the optical disk, a flexible clipping property of the database is formed in capacity and data types. According to the progressive change of data types and data quantity, performance of the database can be adjusted by the formation of database backup on the optical disk, while the integrity and security of database are matched, and reading and writing performance are further enhanced.

Figure 3:
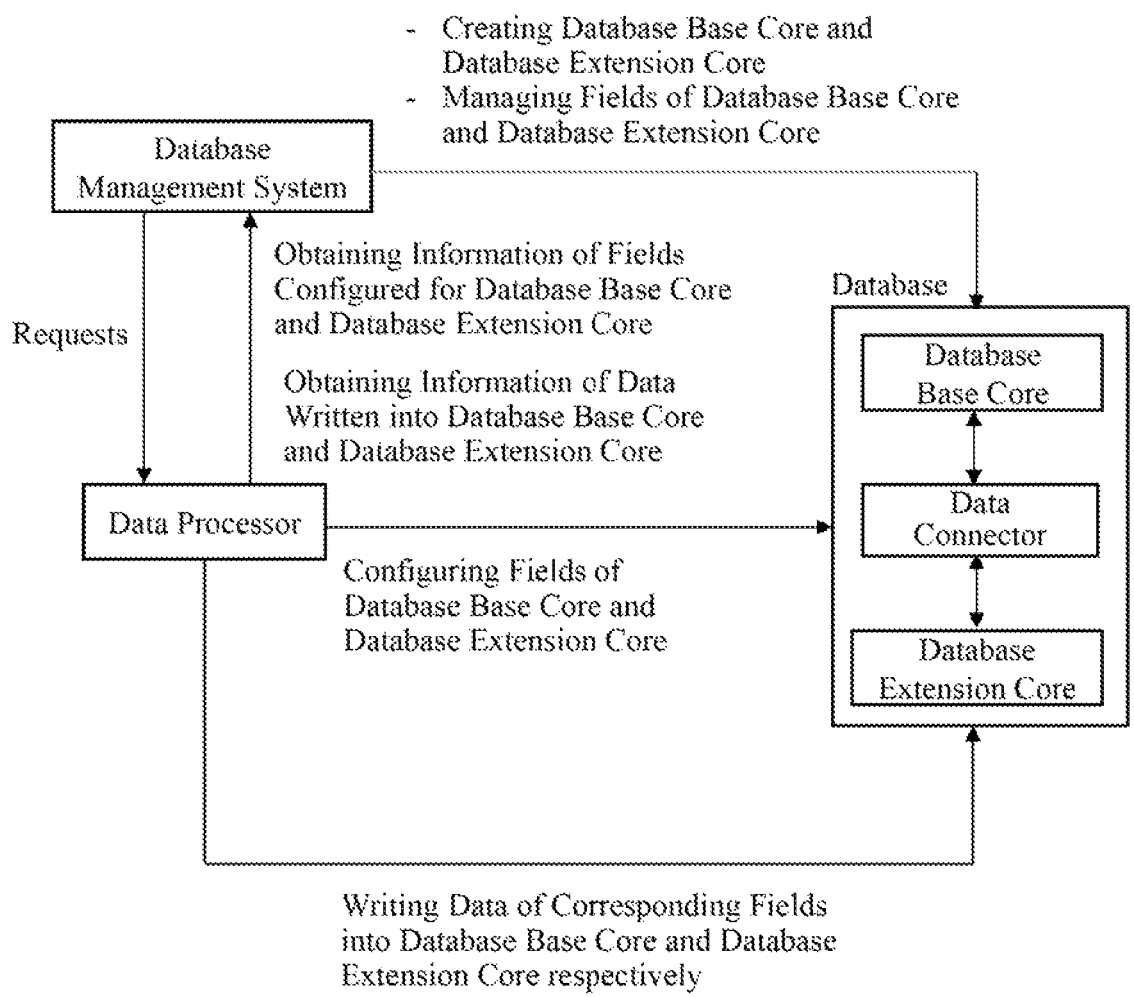
FIG. 3 is a flow diagram of storing data into the database base core and the database extension core in storage devices according to the database dual-core storage system based on optical disk of the present invention.

As shown in FIG. 3, a method of storing data into a database base core and a database extension core in a magnetic disk storage device and an optical disk storage device, wherein the steps are as follows: when transferring data forward, requests are made to configure fields of a database base core and fields of a database extension core in a database for the data processor (120) by the database management system (110), then the fields of the database base core and the fields of the database extension core are configured by the data processor (120) based on a data type and a data length of each field of records; requests are made to write data of the corresponding fields into the database base core and the database extension core respectively for the data processor (120) by the database management system (110), then the data of the corresponding fields is written into the database base core and the database extension core respectively by the data processor (120); when transferring data backward, requests are made to configure fields of the database base core and the database extension core in the database for the data processor (120) by the database management system (110), then information of the configured fields of the database base core and the configured fields of the database extension core is returned by the data processor (120), and the information of the configured fields of the database base core and the configured fields of the database extension core is obtained by the database management system (110); requests are made to write data of the corresponding fields into the database base core and the database extension core respectively for the data processor (120) by the database management system (110), then information of the data written into the database base core and the database extension core is returned by the data processor (120), and the information of the data written into the database base core and the database extension core is obtained by the database management system (110); information of integral records is formed from the information of the data written into the database base core and the database extension core by the data connector (130).

Using the above method, fields of a record can be divided into two parts based on a data type and a data length of each field of records. A part of the fields are in a database base core, and the other part of the fields are in a database extension core. The data of the corresponding fields is written into the database base core and the database extension core respectively. It is possible that all data is input into the database rapidly with high efficiency, which improves the storage performance and the efficiency of database.

Figure 4:
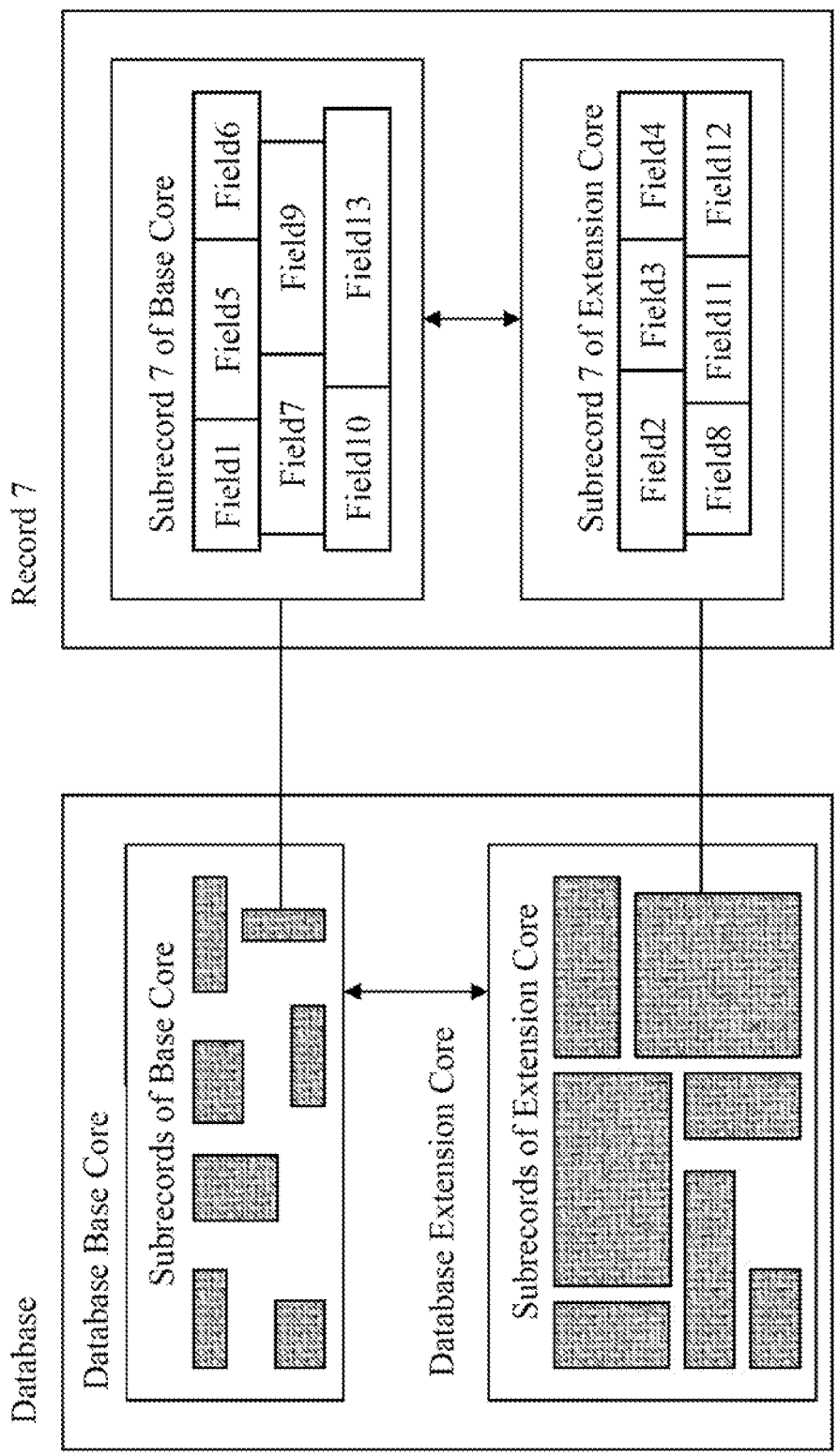
FIG. 4 is a schematic diagram of the physical structure of the database file according to the preferred embodiment of the database dual-core storage system based on optical disk of the present invention.

As shown in FIG. 4, a database contains a database base core and a database extension core. A part of fields are in the database base core, and the other part of the fields are in the database extension core. The fields of the database base core constitute subrecords of the base core, and the fields of the database extension core constitute subrecords of the extension core. The subrecords of the base core and the corresponding subrecords of the extension core form integral records.

In this embodiment, the fields of the database base core constitute subrecords of the base core, and the fields of the database extension core constitute subrecords of the extension core. The subrecords of the base core and the subrecords of the extension core are the integral two parts, which guarantees the integrity of the records. Therefore the methods of database dual-core storage can be widely used for various type and format data.

Figure 5:
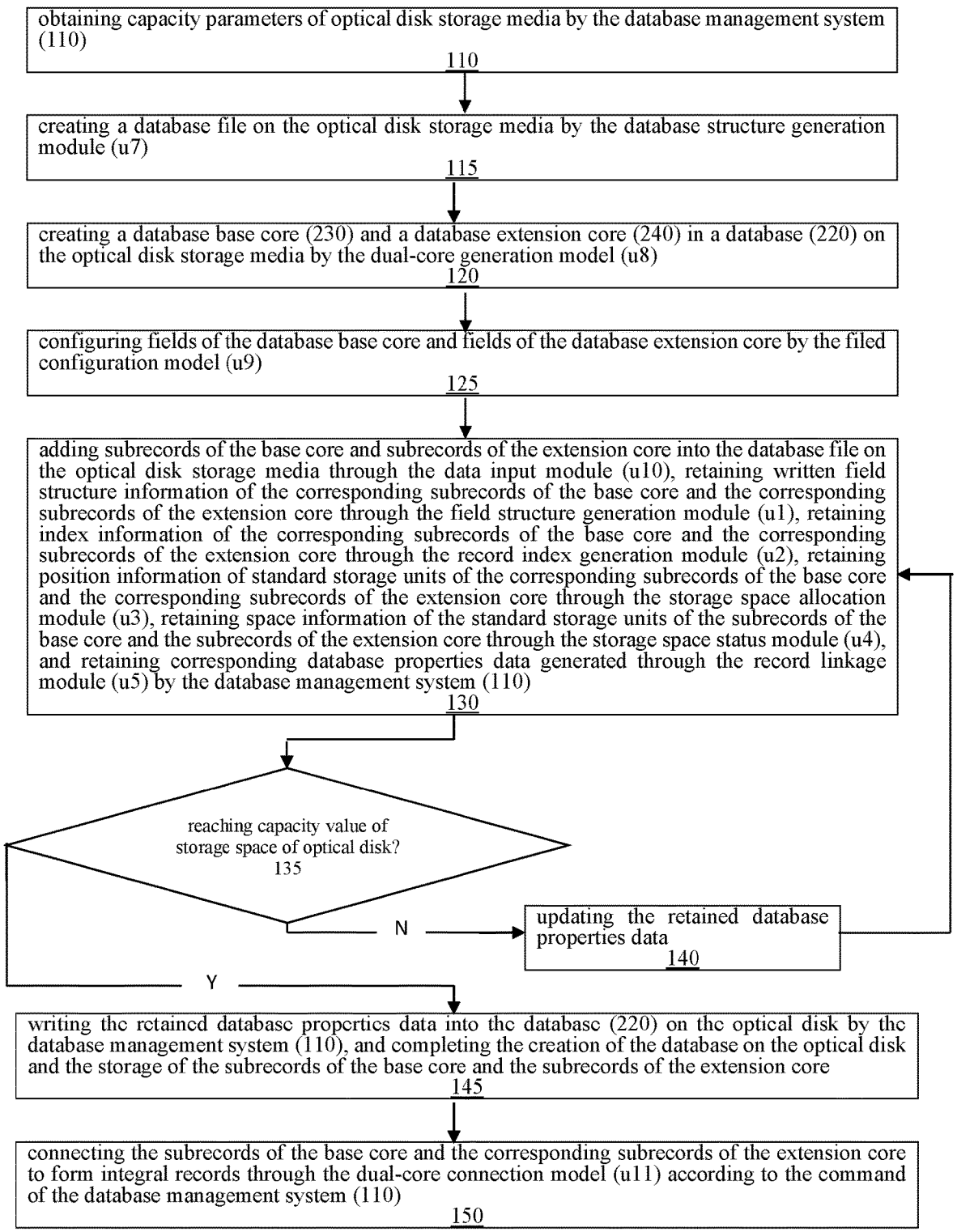
FIG. 5 is flow diagram 1 of methods for data processing using the database dual-core storage system based on optical disk of the present invention.

As shown in FIG. 5, using the above mentioned database dual-core storage system on optical disk, a method of creating a database directly on an optical disk and storing data into a database dual-core, wherein the steps are as follows: in step 110, obtaining capacity parameters of optical disk storage media by the database management system (110); in step 115, creating a database file on the optical disk storage media by the database structure generation module (u7); in step 120, creating a database base core (230) and a database extension core (240) in a database (220) on the optical disk storage media by the dual-core generation model (u8); in step 125, configuring fields of the database base core and fields of the database extension core by the filed configuration model (u9); in step 130, adding subrecords of the base core and subrecords of the extension core into the database file on the optical disk storage media through the data input module (u10), retaining written field structure information of the corresponding subrecords of the base core and the corresponding subrecords of the extension core through the field structure generation module (u1), retaining index information of the corresponding subrecords of the base core and the corresponding subrecords of the extension core through the record index generation module (u2), retaining position information of standard storage units of the corresponding subrecords of the base core and the corresponding subrecords of the extension core through the storage space allocation module (u3), retaining space information of the standard storage units of the subrecords of the base core and the subrecords of the extension core through the storage space status module (u4), and retaining corresponding database properties data generated through the record linkage module (u5) by the database management system (110); in step 135, determining whether to reach the capacity value of the storage space, if yes, executing step 145, otherwise executing step 140; in step 140, repeating step 130, updating the retained database properties data; in step 145, when the capacity of the database reaches the capacity value of the storage space of the optical disk, writing the retained database properties data into the database (220) on the optical disk by the database management system (110), and completing the creation of the database on the optical disk and the storage of the subrecords of the base core and the subrecords of the extension core; in step 150, connecting the subrecords of the base core and the corresponding subrecords of the extension core to form integral records through the dual-core connection model (u11) according to the command of the database management system (110).

Figure 6:
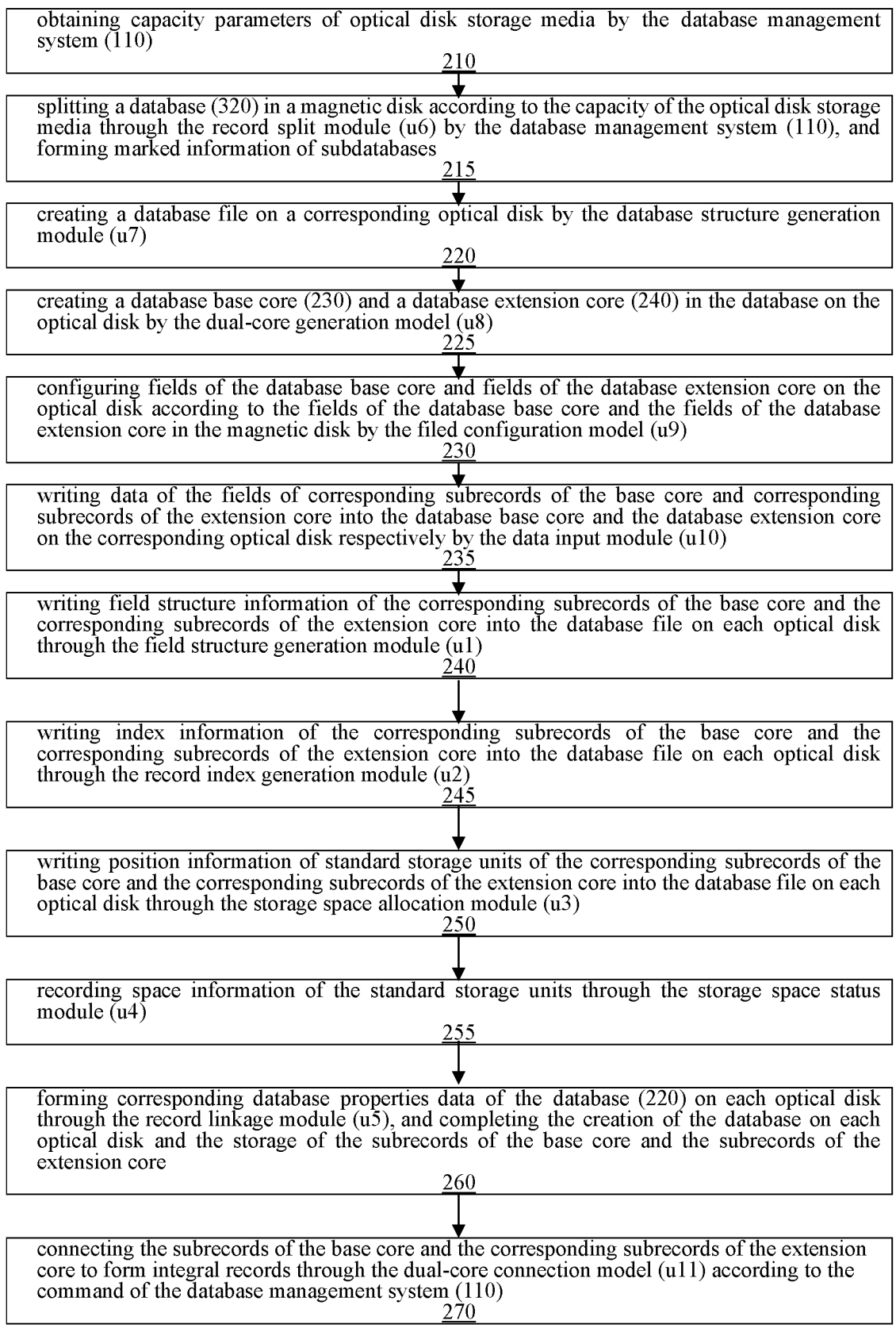
FIG. 6 is flow diagram 2 of methods for data processing using the database dual-core storage system based on optical disk of the present invention.

As shown in FIG. 6, using the above mentioned database dual-core storage system on optical disk, a method of transferring a database created in the magnetic disk and data stored in a database dual-core onto optical disks, wherein the steps are as follows: in step 210, obtaining capacity parameters of optical disk storage media by the database management system (110); in step 215, splitting a database (320) in a magnetic disk according to the capacity of the optical disk storage media through the record split module (u6) by the database management system (110), and forming marked information of subdatabases; in step 220, creating a database file on a corresponding optical disk by the database structure generation module (u7); in step 225, creating a database base core (230) and a database extension core (240) in the database on the optical disk by the dual-core generation model (u8); in step 230, configuring fields of the database base core and fields of the database extension core on the optical disk according to the fields of the database base core and the fields of the database extension core in the magnetic disk by the filed configuration model (u9); in step 235, writing data of the fields of corresponding subrecords of the base core and corresponding subrecords of the extension core into the database base core and the database extension core on the corresponding optical disk respectively by the data input module (u10); in step 240, writing field structure information of the corresponding subrecords of the base core and the corresponding subrecords of the extension core into the database file on each optical disk through the field structure generation module (u1); in step 245, writing index information of the corresponding subrecords of the base core and the corresponding subrecords of the extension core into the database file on each optical disk through the record index generation module (u2); in step 250, writing position information of standard storage units of the corresponding subrecords of the base core and the corresponding subrecords of the extension core into the database file on each optical disk through the storage space allocation module (u3); in step 255, recording space information of the standard storage units through the storage space status module (u4); in step 260, forming corresponding database properties data of the database (220) on each optical disk through the record linkage module (u5), and completing the creation of the database on each optical disk and the storage of the subrecords of the base core and the subrecords of the extension core; in step 270, connecting the subrecords of the base core and the corresponding subrecords of the extension core to form integral records through the dual-core connection model (u11) according to the command of the database management system (110).

Based on the database storage system of the above mentioned embodiment, a concrete method of creating a database on an optical disk using the database dual-core storage system based on optical disk includes the following steps:

In step 1, a server is connected with a jukebox.

In step 2, a database management system software, a data processor, a data connector and a jukebox management software are installed on the server.

In step 3, a drive letter of a virtual jukebox is configured in a configuration file, MYCD=Z:\, wherein MYCD is the drive letter of the virtual jukebox, and Z is the drive letter of the jukebox.

In step 4, a volume label "BD1" is created on an optical disk by the jukebox management software.

In step 5, a database is created on the optical disk, the command "MYCD:BD1\database1" is executed.

In step 6, a database (sub)file BASF corresponding to a database base core and a database (sub)file BOSF corresponding to a database extension core, or a database base core BASF and a database extension core BOSF are created in the database on the optical disk, the command "MYCD:BD1\database1\database1.BASF" and "MYCD:BD1\database1\database1.BOSF" are executed.

In step 7, fields of the database base core and fields of the database extension core are configured.

In step 8, data of the corresponding fields is written into the database base core and the database extension core on the optical disk respectively.

One skilled in the art will understand that the embodiments of the present invention as shown in the drawings and described above are exemplary only and not intended to be limiting. It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

INDUSTRIAL APPLICABILITY

According to the database dual-core storage system based on optical disk of the present invention, the existing magnetic disk and optical disk resource can be fully utilized. The desired path for realizing the process of storage of various type and format data in the magnetic disk storage device and the optical disk storage device using the database base core and the database extension core is provided. Therefore, the market prospect is great and the industrial applicability is strong.

What is claimed is:

1. An improved database dual-core storage system based on an optical disk storage device, comprising: a server in a computer system, a magnetic disk storage device and an optical disk storage device connecting to the server via data connection, a magnetic disk database is created in the magnetic disk storage device, optical disk databases are created on optical disks in the optical disk storage device, a database management system, a data processor and a data connector installed on the server;

wherein the database management system is arranged for completing database management and data management of the magnetic disk storage device and for completing database management and data management of the optical disk storage device in response to data requests;

wherein the data processor is arranged for configuring fields of a database base core and fields of a database extension core, writing data of corresponding fields into the database base core and the database extension core respectively in response to data requests; and wherein the data connector is arranged for creating data connection between the database base core and the database extension core in response to data requests;

wherein fields of a record stored in a database are divided into two parts by the data processor, a part of the fields are in the database base core, and a database (sub)file corresponding to the database base core is formed, the other part of the fields are in the database extension core, and a database (sub)file corresponding to the database extension core is formed, the fields of the database base core constitute a subrecord of the base core, and the fields of the database extension core constitute a subrecord of the extension core, the subrecord of the base core and the corresponding subrecord of the extension core form an integral record through the data connector, the database (sub)file corresponding to the database base core and the database (sub)file corresponding to the database extension core form an integral database file through the data connector;

wherein the database dual core storage system comprises a program instructions to perform a process of storing data into a database base core and a database extension core in a magnetic disk storage device and an optical disk storage device, wherein the program instructions comprise the steps of:

when transferring data forward:

making requests to configure fields of a database base core and fields of a database extension core in a database for the data processor by the database management system, then configuring the fields of the database base core and the fields of the database extension core by the data processor based on a data type and a data length of each field of records;

making requests to write data of the corresponding fields into the database base core and the database extension core respectively for the data processor by the database management system, then writing the data of the corresponding fields into the database base core and the database extension core respectively by the data processor; and when transferring data backward:

making requests to configure fields of the database base core and fields of the database extension core in a database for the data processor by the database management system, then returning information of the configured fields of the database base core and the configured fields of the database extension core by the data processor, and obtaining the information of the configured fields of the database base core and the configured fields of the database extension core by the database management system;

making requests to write data of the corresponding fields into the database base core and the database extension core respectively for the data processor by the database management system, then returning information of the data written into the database base core and the database extension core by the data processor, and obtaining the information of the data written into the database base core and the database extension core by the database management system; and forming information of integral records from the information of the data written into the database base core and the database extension core by the data connector.

2. The improved database dual-core storage system based on optical disk storage device according to claim 1, wherein the database management system comprises: one or more processor, and a memory couples to the processor for executing a field structure generation module, a record index generation module, a storage space allocation module, a storage space status module, a record linkage module, a record split module, a database structure generation module and a dual-core generation module;

wherein the field structure generation module is configured to read field structure information of each record of the database and write the field structure information of each record of the database into a database file and the database management system, wherein the field structure information comprises a data type and a data length of each field of the record;

wherein the record index generation module is configured to record index information of each record of the database and write the index information of each record of the database into the database file or the database management system, wherein the index information comprises a modification time and a modification content of each field of the record;

wherein the storage space allocation module is configured to record position information of allocated standard storage units of each record in the database file, and write the position information into the database file or the database management system;

wherein the storage space status module is configured to record free space information of the allocated standard storage units in the database file, and write the free space information into the database file or the database management system;

wherein the record linkage module is configured to combine the field structure information, the index information, the position information and the space information of the standard storage units of each record of the database to form database properties data, and write the database properties data into the database file or the database management system;

wherein the record split module is configured to process a record splitting process for the records of the database according to the command of the database management system, wherein the record splitting process is processed in a record unit, in which the database properties data is read, the position and the amount of data of each field in the records are determined, records conforming to the command parameters are marked, and marked information is written into the database file or the database management system;

wherein the database structure generation module is configured to form an independent data file for the database structure of the database, wherein the database management system is configured to create an optical disk database having a database structure identical to the magnetic disk database on an optical disk or create a magnetic disk database having the same database structure in other magnetic disk storage device based on the independent data file;

wherein the dual-core generation module is configured to create a database base core or a database file of the database base core, and a database extension core or a database file of the database extension core in the magnetic disk database in the magnetic disk storage device by the database management system, or create a database base core or a database file of the database base core, and a database extension core or a database file of the database extension core in the optical disk database on the optical disk by the database management system, and write creation information into the database file or the database management system.

3. The improved database dual-core storage system based on optical disk storage device according to claim 1, wherein the data processor comprises a filed configuration model and a data input model;

wherein the filed configuration model is configured to configure fields of a database base core and fields of a database extension core based on a data type and a data length of each field of records, and form subrecords of the base core and subrecords of the extension core, and write field configuration information into the database file or the database management system;

wherein the data input model is configured to write data of the corresponding fields into the database base core and the database extension core in the magnetic disk or the database base core and the database extension core on the optical disk respectively based on the fields of the database base core and the fields of the database extension core configured by the filed configuration model according to the command of the database management system.

4. The improved database dual-core storage system based on optical disk storage device according to claim 1, wherein the data connector comprises a dual-core connection model which is configured to connect a subrecord of the database base core and a corresponding subrecord of the database extension core to form an integral record according to the command of the database management system.

5. The database dual-core storage system of a server in a computer system based on optical disk storage device according to claim 4, wherein the database dual-core storage system comprises program instructions to perform a process of creating a database directly in an optical disk storage device and storing data into a database dual-core, wherein the program instructions comprises the steps of:

obtaining capacity parameters of optical disk storage media by the database management system;

creating a database file on the optical disk storage media by the database structure generation module;

creating a database base core and a database extension core in a database on the optical disk storage media by the dual-core generation model;

configuring fields of the database base core and fields of the database extension core by the filed configuration model;

adding subrecords of the base core and subrecords of the extension core into the database file on the optical disk storage media through the data input module, retaining written field structure information of the corresponding subrecords of the base core and the corresponding subrecords of the extension core through the field structure generation module, retaining index information of the corresponding subrecords of the base core and the corresponding subrecords of the extension core through the record index generation module, retaining position information of standard storage units of the corresponding subrecords of the base core and the corresponding subrecords of the extension core through the storage space allocation module, retaining space information of the standard storage units of the subrecords of the base core and the subrecords of the extension core through the storage space status module, and retaining corresponding database properties data generated through the record linkage module by the database management system;

determining whether to reach the capacity value of the storage space of the optical disk, if no, repeating the above operation, updating the retained database properties data;

when the capacity of the database reaches the capacity value of the storage space of the optical disk, writing the retained database properties data into the database on the optical disk by the database management system, and completing the creation of the database on the optical disk and the storage of the subrecords of the base core and the subrecords of the extension core;

connecting the subrecord of the base core and the corresponding subrecord of the extension core to form integral records through the dual-core connection model according to the command of the database management system.

6. The database dual-core storage system of a server in a computer system based on optical disk storage device according to claim 4, wherein the database dual-core storage system comprises program instructions to perform a process of transferring a database created in a magnetic disk and data stored in a database dual-core onto optical disks, wherein the program instructions comprises the steps of:

- obtaining capacity parameters of optical disk storage media by the database management system;
- splitting a database in a magnetic disk according to the capacity of the optical disk storage media through the record split module by the database management system, and forming marked information of subdatabases;
- creating a database file on a corresponding optical disk by the database structure generation module;
- creating a database base core and a database extension core in the database on the optical disk by the dual-core generation model;
- configuring fields of the database base core and fields of the database extension core on the optical disk according to the fields of the database base core and the fields of the database extension core in the magnetic disk by the filed configuration model;
- writing data of the fields of corresponding subrecords of the base core and corresponding subrecords of the extension core into the database base core and the database extension core on the corresponding optical disk respectively by the data input module;
- writing field structure information of the corresponding subrecords of the base core and the corresponding subrecords of the extension core into the database file on each optical disk through the field structure generation module;
- writing index information of the corresponding subrecords of the base core and the corresponding subrecords of the extension core into the database file on each optical disk through the record index generation module;
- writing position information of standard storage units of the corresponding subrecords of the base core and the corresponding subrecords of the extension core into the database file on each optical disk through the storage space allocation module;
- recording space information of the standard storage units through the storage space status module;
- forming corresponding database properties data of the database on each optical disk through the record linkage module, and completing the creation of the database on each optical disk and the storage of the subrecords of the base core and the subrecords of the extension core;
- connecting the subrecords of the base core and the corresponding subrecords of the extension core to form integral records through the dual-core connection model according to the command of the database management system.

* * * * *